US008780508B2

(12) United States Patent
Dimitrov et al.

(10) Patent No.: US 8,780,508 B2
(45) Date of Patent: Jul. 15, 2014

(54) MAGNETIC ELEMENT WITH BIASED SIDE SHIELD LAMINATION

(75) Inventors: Dimitar Velikov Dimitrov, Edina, MN (US); Dian Song, Eden Prairie, MN (US); Mark William Covington, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/539,099

(22) Filed: Jun. 29, 2012

(65) Prior Publication Data

US 2014/0002930 A1    Jan. 2, 2014

(51) Int. Cl.
G11B 5/33   (2006.01)
G11B 5/39   (2006.01)

(52) U.S. Cl.
USPC .................................. 360/324.12; 360/324

(58) Field of Classification Search
USPC ........................................... 360/324.12, 324
See application file for complete search history.

(56) References Cited

U.S. PATENT DOCUMENTS

| | | | |
|---|---|---|---|
| 4,740,855 A | 4/1988 | Diepers et al. | |
| 4,935,832 A | 6/1990 | Das et al. | |
| 5,515,221 A | 5/1996 | Gill et al. | |
| 5,576,914 A | 11/1996 | Rottmayer et al. | |
| 5,818,685 A | 10/1998 | Thayamballi et al. | |
| 6,256,176 B1 | 7/2001 | Mao et al. | |
| 6,529,353 B2 * | 3/2003 | Shimazawa | 360/324.2 |
| 6,597,546 B2 | 7/2003 | Gill | |
| 6,667,862 B2 | 12/2003 | Zhu | |
| 6,700,760 B1 | 3/2004 | Mao | |
| 6,903,906 B2 * | 6/2005 | Morinaga et al. | 360/324.12 |
| 6,914,759 B2 | 7/2005 | Chen et al. | |
| 7,035,062 B1 | 4/2006 | Mao et al. | |
| 7,093,347 B2 | 8/2006 | Nowak et al. | |
| 7,236,333 B2 | 6/2007 | Macken | |
| 7,295,401 B2 | 11/2007 | Jayasekara et al. | |
| 7,333,304 B2 | 2/2008 | Gill et al. | |
| 7,446,979 B2 | 11/2008 | Jayasekara | |
| 7,446,986 B2 * | 11/2008 | Araki et al. | 360/324.12 |
| 7,599,151 B2 | 10/2009 | Hatatani et al. | |
| 7,606,007 B2 | 10/2009 | Gill | |
| 7,623,324 B2 | 11/2009 | Honda et al. | |
| 7,876,534 B2 | 1/2011 | Chou et al. | |
| 7,979,978 B2 | 7/2011 | Han et al. | |
| 8,085,500 B2 | 12/2011 | Yazawa et al. | |
| 8,144,437 B2 | 3/2012 | Miyauchi et al. | |
| 2002/0051380 A1 | 5/2002 | Kamiguchi et al. | |
| 2002/0081458 A1 * | 6/2002 | Hasegawa et al. | 428/692 |
| 2002/0114111 A1 | 8/2002 | Zhu | |
| 2002/0135954 A1 | 9/2002 | Yoshikawa et al. | |

(Continued)

FOREIGN PATENT DOCUMENTS

| | | |
|---|---|---|
| JP | 2002-319112 A | 10/2002 |
| JP | 2005-203063 A | 7/2005 |
| JP | 2012-119053 A | 6/2012 |

*Primary Examiner* — Wayne Young
*Assistant Examiner* — Carlos E Garcia
(74) *Attorney, Agent, or Firm* — Hall Estill Attorneys at Law (57) ABSTRACT

A magnetic element is generally provided that can be implemented as a transducing head. Various embodiments may configure a magnetic stack having a magnetically free layer with a predetermined magnetization. A side shield lamination can be separated from the magnetic stack on an air bearing surface (ABS) and biased to a bias magnetization that opposes the predetermined magnetization.

20 Claims, 6 Drawing Sheets

(56) References Cited

U.S. PATENT DOCUMENTS

| | | |
|---|---|---|
| 2004/0160700 A1 | 8/2004 | Kagami et al. |
| 2005/0063100 A1 | 3/2005 | Kautzky et al. |
| 2005/0157431 A1 | 7/2005 | Hatatani et al. |
| 2005/0264944 A1 | 12/2005 | Fontana et al. |
| 2006/0044701 A1 | 3/2006 | Funayama |
| 2006/0092582 A1 | 5/2006 | Gill et al. |
| 2006/0230601 A1 | 10/2006 | Gill et al. |
| 2006/0232893 A1 | 10/2006 | Gill et al. |
| 2006/0245117 A1 | 11/2006 | Nowak et al. |
| 2009/0034132 A1 | 2/2009 | Miyauchi et al. |
| 2009/0034133 A1 | 2/2009 | Miyauchi et al. |
| 2009/0109580 A1 | 4/2009 | Ayukawa et al. |
| 2009/0135529 A1* | 5/2009 | Shimazawa et al. .......... 360/319 |
| 2009/0166184 A1 | 7/2009 | Zhou et al. |
| 2009/0168241 A1 | 7/2009 | Mochizuki et al. |
| 2009/0180217 A1 | 7/2009 | Chou et al. |
| 2009/0262465 A1 | 10/2009 | Hatatani et al. |
| 2009/0279213 A1 | 11/2009 | Wu et al. |
| 2009/0302403 A1* | 12/2009 | Nguyen ........................ 257/421 |
| 2010/0027167 A1 | 2/2010 | Gill et al. |
| 2010/0039734 A1 | 2/2010 | Hara et al. |
| 2011/0051291 A1* | 3/2011 | Miyauchi et al. .......... 360/245.3 |
| 2011/0069417 A1 | 3/2011 | Kawamori et al. |
| 2011/0279923 A1 | 11/2011 | Miyauchi et al. |
| 2012/0087045 A1* | 4/2012 | Yanagisawa et al. .......... 360/294 |
| 2012/0134057 A1 | 5/2012 | Song et al. |

\* cited by examiner

MAGNETIC ELEMENT WITH BIASED SIDE SHIELD LAMINATION

SUMMARY

Various embodiments are generally directed to a magnetic element capable of at least magnetic reading.

In accordance with various embodiments, a magnetic stack may be configured to have a magnetically free layer with a predetermined magnetization. A side shield lamination can be separated from the magnetic stack on an air bearing surface (ABS) and biased to a bias magnetization that opposes the predetermined magnetization.

DETAILED DESCRIPTION

As industry demand advances towards higher data bit density and faster data transfer rates in data storage devices, the physical and magnetic size of various data reading and writing components become stressed by process and design variability. The introduction of smaller data access elements, such as non-pinned trilayer magnetically responsive stacks, can reduce shield-to-shield spacing between magnetic shields and provide increased data bit sensitivity, but may be susceptible to magnetic asymmetry with minor process variations. Hence, a magnetic element configured to provide increased data bit resolution while decreasing susceptibility to design and process variability is a continued demand of the industry.

Accordingly, a magnetic stack can be separated from a side shield lamination on an air bearing surface (ABS). The magnetic stack may have a magnetically free layer that has a predetermined magnetization while the side shield lamination can be biased to a bias magnetization that opposes the predetermined magnetization. The presence of the bias magnetization in the side shield lamination in opposite directions from the magnetization of the magnetic stack can maximize cross-track data bit resolution and track density capability as the magnetic width and magnetic asymmetry are minimized.

Figure 1:
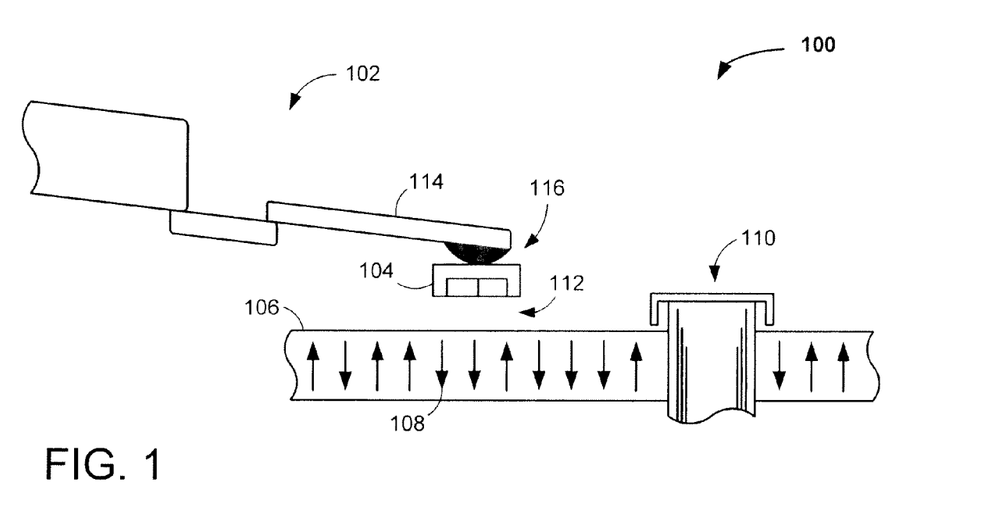
FIG. 1 is a block representation of an exemplary portion of a data storage device.

Although a magnetically responsive magnetic stack can be constructed in a variety of environments, an exemplary data transducing portion 100 of a data storage device is provided in FIG. 1. The transducing portion 100 has an actuating assembly 102 that positions a transducing head 104 over a magnetic storage media 106 that is capable of storing programmed bits 108. The storage media 106 is attached to a spindle motor 110 that rotates during use to produce an air bearing surface (ABS) 112 on which a slider portion 114 of the actuating assembly 102 flies to position a head gimbal assembly (HGA) 116, which includes the transducing head 104, over a desired portion of the media 106.

The transducing head 104 can include one or more transducing elements, such as a magnetic writer and magnetically responsive reader, which operate to program and read data from the storage media 106, respectively. In this way, controlled motion of the actuating assembly 102 causes the transducers to align with tracks (not shown) defined on the storage media surfaces to write, read, and rewrite data.

It should be noted that the term "stack" is an unlimited term within this disclosure that can be one layer, or a lamination of layers, constructed of magnetic and non-magnetic material. Throughout the present application, the term "stack" will he understood to mean a component that is constructed to be magnetically responsive to external data bits in any operational environment. For example, but not in any way limiting, a magnetic stack may be a data read or write configuration that can differentiate between a plurality of data bits.

Figure 2:
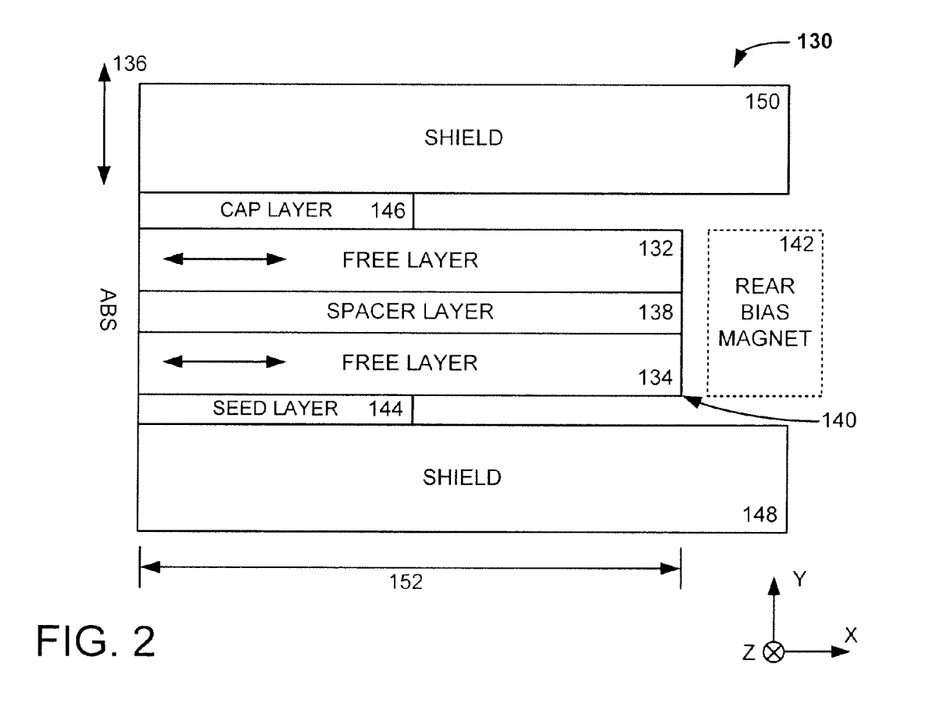
FIG. 2 provides a cross-section block representation of an example magnetic element capable of being used in the data storage device of FIG. 1.

FIG. 2 displays a cross-section block representation of example magnetic element 130 capable of being used in the data storage device 100 of FIG. 1. The element 130 has first and second ferromagnetic free layers 132 and 134 that are each sensitive to external magnetic fields. That is, each free layer 132 and 134 will respond to an encountered external magnetic field, such as programmed magnetic bits on data tracks 136 of an adjacent data storage medium that is separated from the free layers 132 and 134 by an air bearing surface (ABS). The relative angle between free layer 132 and 134 will be different for media fields pointing into or out of the ABS, as measured along the X axis, which will translate to low or high resistance/voltage states.

The free layers 132 and 134 are each contactingly adjacent a non-magnetic spacer layer 138 that acts to provide a measureable magnetoresistive effect between layers 132 and 134. While the spacer 138 can be constructed of any non-magnetic material with a predetermined thickness, a variety of different non-limiting configurations can be used to accommodate varying free layer magnetic interactions and data bit sensing. The coupled lamination of the free layers 132 and 134 to the spacer layer 138 can be characterized as a magnetic stack 140 that is influenced, in some embodiments, by a rear mounted bias magnet 142 that imparts a predetermined magnetic biasing field on the free layers 132 and 134 to set a default magnetization.

The magnetic stack 140 can further be constructed where each of the free layers 132 and 134 are additionally coupled to a respective electrode layer, such as seed layer 144 and cap layer 146 that provide appropriate growth template (seed) or protection (cap) during stack definition process. It is contemplated, however, that the magnetic element 130 is constructed without the electrode layers while in other embodiments the composition, shape, and placement of the electrode layers 144 and 146 are modified, as needed, to provide performance and manufacturing benefits, such as enlarging one or both of the width or length of layers 144 and 146.

While encountering the data bits along a particular data track 136, data bits from adjacent tracks can inadvertently be sensed by the magnetic stack 140. At least one shield layer can therefore be attached to each of the electrode layers 144 and 146 to reduce the magnetic width of the stack 140 and minimize such inadvertent data bit sensing. The shield layers 148 and 150 can be oriented in a variety of formations and compositions, none of which are required or limited, to direct unwanted magnetic flux away from the free layers 132 and 134.

The shielding of the magnetic stack 140 can be supplemented with other shield layers, such as side shields, that may or may not provide bias fields to the magnetic stack 140. The side shields may further combine with shield layers 148 and 150 to allow for improved magnetic sensing of programmed data bits from the preset data tracks 136 by eliminating noise and inadvertent sensing of adjacent bits. The size and number of shielding and biasing layers can influence the magnetization strength needed to reliably operate the magnetic stack 140, particularly in high linear data bit density recordings.

Magnetic stability of the stack 140 can be increased with the elongation of the stack's stripe height 152, as measured along the X axis. Elongated stripe heights can correspond to smaller sensitivity to process variations which can lead to increased magnetic yield. While a number of magnetic shield 148 and 150 configurations can increase linear data bit resolution, the use of side shields positioned laterally from the magnetic stack 140 on the ABS provides an efficient minimization of the magnetic width of the element 130 and increased data track density capability.

Figure 3A:
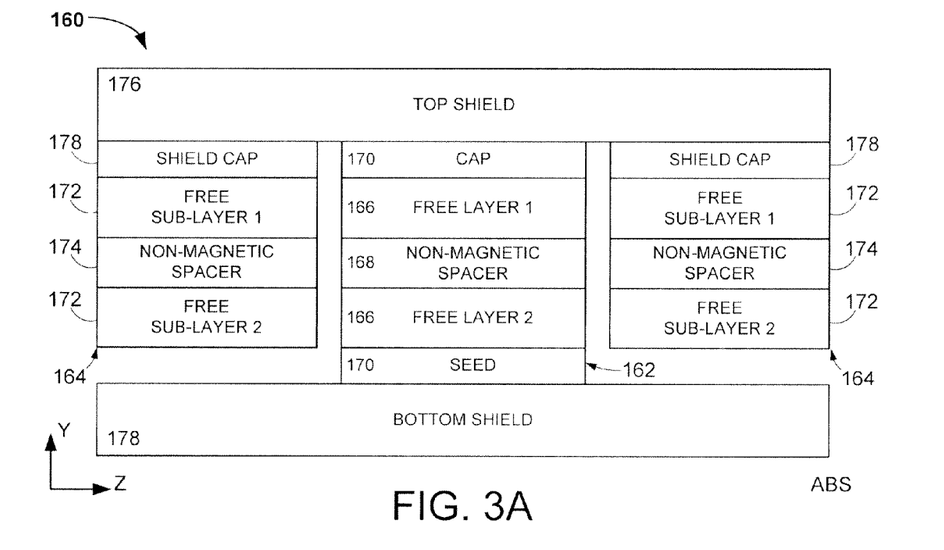
FIGS. 3A and 3B respectively show different block representations of portions of an example magnetic element constructed in accordance with various embodiments.
Figure 3B:
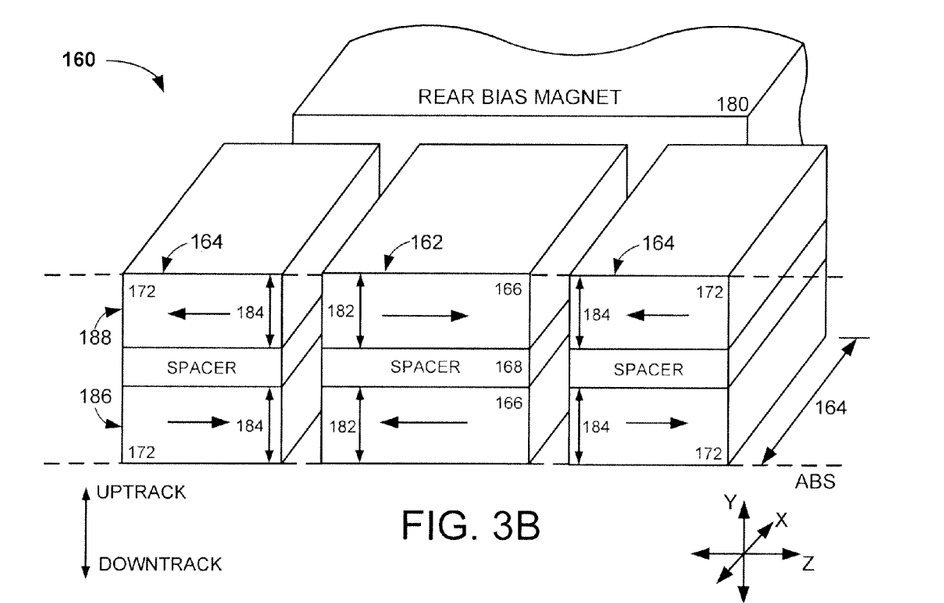

FIGS. 3A and 3B respectively provide ABS and isometric views of an example magnetic element 160 constructed with a magnetic stack 162 disposed between side shield laminations 164 on the ABS. The magnetic stack 162 is configured as a trilayer read sensor, much like the magnetic stack 140 of FIG. 2, with dual magnetically free layers 166 separated by non-magnetic spacer layer 168 and disposed between electrode cap and seed layer 170. In the embodiment shown, each side shield lamination 164 is constructed to match the magnetic stack 162 with magnetically layers 172 separated from each other by a non-magnetic spacer layer 174 and from a top shield 176 by a shield cap layer 178.

While one, or both, side shield laminations 164 can be coupled to the top and bottom shields 176 and 178, FIG. 3A displays an embodiments where each side shield lamination 164 connects to the top shield 176 through the shield cap 178 and is magnetically and electrically isolated from the bottom shield 178 by insulating material. The use of insulating material can further provide a magnetic buffer between the magnetic stack 162 and each side shield lamination 164 that can be tuned to provide a predetermined amount of magnetic influence onto the free layers 166 of the stack 162. That is, the thickness of insulating material between the magnetic stack 162 and side shield laminations 164 can be tuned to impart more, or less, of the magnetization from the side shield laminations 164 onto the free layers 166.

Turning to the isometric view of the magnetic element 160 shown in FIG. 3B, a rear bias magnet 180 is positioned adjacent and electrically isolated from the magnetic stack 162 distal the ABS. The rear bias magnet 180 can be configured with a thickness, along the Y axis, and width, along the Z axis, that imparts a predetermined amount of magnetic flux on the magnetic stack 162 and side shield laminations 164. That is, the rear bias magnet 180 can be used in some embodiments to set both a default magnetization in the magnetic stack 162 and a bias magnetization in one or more side shield laminations 164.

Regardless of the source and magnitude of bias magnetization, the configuration of the magnetic stack 162 and side shield lamination 164 layers can impact the magnetic performance of the element 160, such as stray field containment. By substantially aligning the magnetically free layers 166 and 172 of the magnetic stack 162 and side shield laminations 164, coupling effects that can detrimentally decrease cross-track resolution by increasing magnetic width may be controlled. The addition of tuning the magnetically free layers 166 and 172 with substantially matching thicknesses 182 and 184 can combine with the lateral alignment or the layers to decrease magnetic coupling effects while increasing cross-track resolution.

It should be noted that while common thicknesses 180 and 182 are shared by both magnetically free layers 166 of the magnetic stack 162 and the side shield lamination 164, various embodiments are constructed with differing thicknesses for the magnetically free layers 166 of the magnetic stack 162. which are tuned to match the free layers 172 of the side shield laminations. That is, the laterally aligned lower layer 186 of the side shield lamination 164 and magnetic stack 162 can have a first thickness that differs from a second thickness of the laterally aligned upper layer 188.

While the tuned configuration of the magnetic stack 162 and side shield lamination 164 layers can provide greater control of element 160 operation, the relative direction of the side shield bias magnetizations may allow for the reduction of magnetic width and decrease coupling effects between the magnetic stack 164 and side shield laminations 162. The tuning of the bias magnetizations of the side shield lamination 164 layers with magnetization directions that oppose the magnetizations of the magnetic stack 164 can complement the aligned, matching thickness configuration of the magnetic free layers 166 and 172 to reduce magnetic width and increase cross-track resolution, especially in condensed data storage device form factors.

Figure 4A:
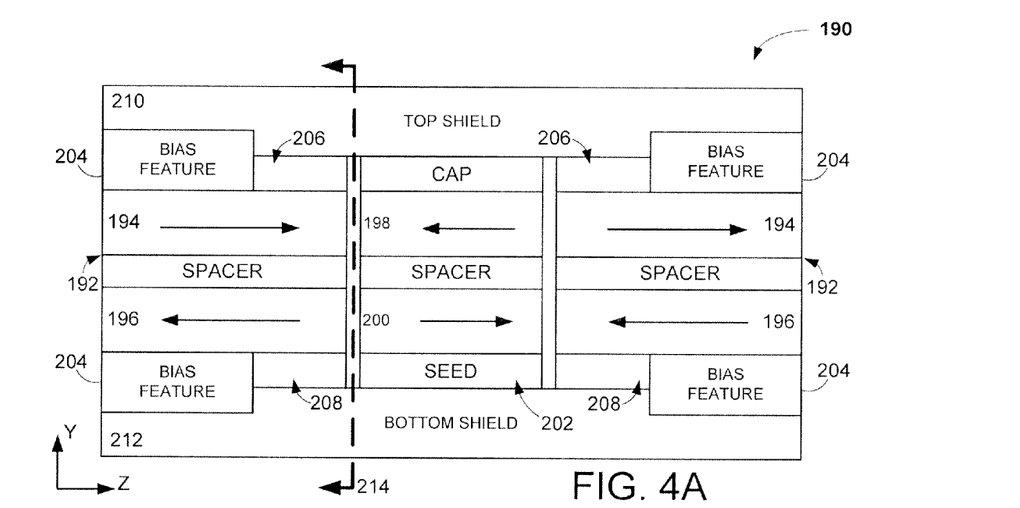
FIGS. 4A and 4B respectively display front and cross-section block representations of an example magnetic element.
Figure 4B:
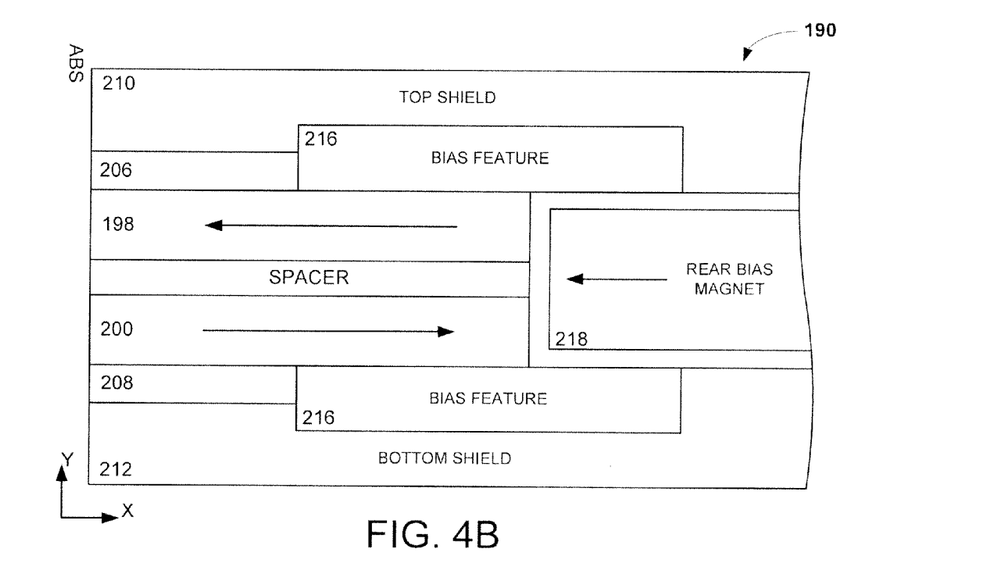

FIGS. 4A and 4B display respective ABS and cross-section block representation of an example magnetic element 190 configured to set the bias magnetizations of the side shield lamination 192 free layers 194 and 196 to directions that are out of phase with the free layers 198 and 200 of the magnetic stack 202. While not limited to a particular manner of biasing the side lamination free layers 194 and 196, various embodiments contactingly couple bias features 204 to opposite sides of each side shield lamination 192.

As shown in FIG. 4A, bias features 204 are positioned distal to the magnetic stack 202 so to not detrimentally impact the default magnetization of the stack free layers 198 and 200. Shield cap and seed layers 206 and 208 can further be positioned between the bias features 204 and the magnetic stack 202 to buffer the magnetic influence of the bias features 204 on the stack free layers 198 and 200. The thickness of one or more of the bias features 204 can increase the shield-to-shield distance of the magnetic element 190, which can reduce element scalability in small Form factor devices. However, portions of the top and bottom shields 210 and 212 can be removed in a variety of non-limiting shapes to accommodate the bias features 204 while not increasing the shield-to-shield spacing of the element 190.

The use of bias features 204 is not limited to a particular configuration structurally or materially. For example, the bias features 204 can be a solid high coercivity material, such as an antiferromagnetic material with a high block temperature, or a lamination of soft magnetic materials providing anti ferromagnetic coupling. The position and function of the bias features 204 arc also not limited as FIG. 4B generally illustrates with the cross-section view of the magnetic element 190 from line 214, which shows the magnetic stack 202 set to a default magnetization by stack bias features 216. While not positioned on the ABS, the stack bias features 216 can be directly coupled to the magnetically free layers 198 and 200 distal to the ABS and still provide enough magnetization to set the stack 202 to a predetermined default magnetization.

Much like the bias features 204 of FIG. 4A, the stack bias features 216 can be tuned with various materials and sizes that can be nested in recessed portions of the top and bottom shields 210 and 212 to avoid increasing the physical size of the magnetic element 190. The contacting position of the stack bias features 216 and the magnetically free layers 198 and 200 may provide enough magnetic strength to set the magnetic stack 202 to a default magnetization either alone or in concert with a rear bias magnet 218. That is, the rear bias magnet 218 can provide some, or all, of the magnetization needed to set the stack free layers 198 and 200 to a default magnetization conducive to reading data bits.

The bias features 204 and 216 are not limited to the shape, orientation, and material configuration shown in FIGS. 4A and 4B. In some embodiments, the bias features 204 contacting the side shield laminations 192 are constructed with anti-ferromagnetic layers having different blocking temperatures, which can allow for tuning of the magnetic direction of the coupled free layers 194 and 196. Other embodiments configure each bias feature 204 and 216 with differing blocking temperature layers to allow magnetization direction tuning for both the magnetic stack 202 and the side shield laminations 192.

Figure 5A:
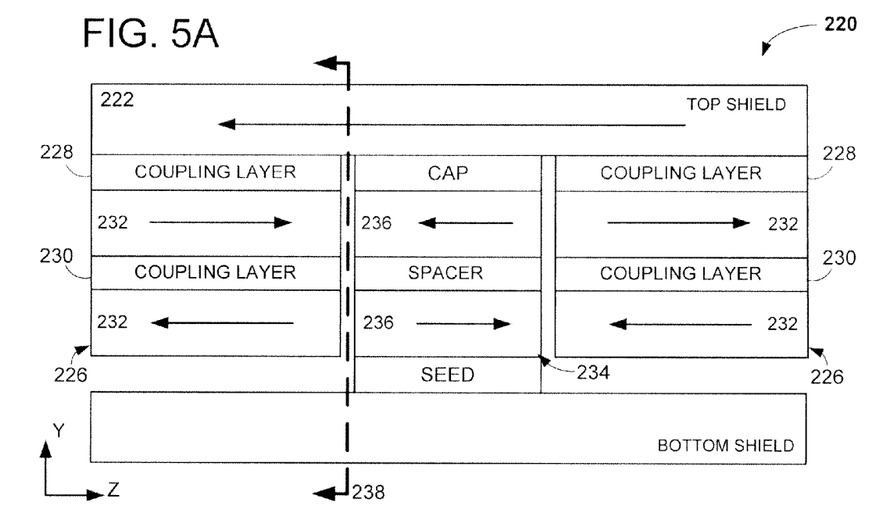
FIGS. 5A and 5B respectively illustrate front and cross-section block representations of an example magnetic element constructed in accordance with various embodiments.
Figure 5B:
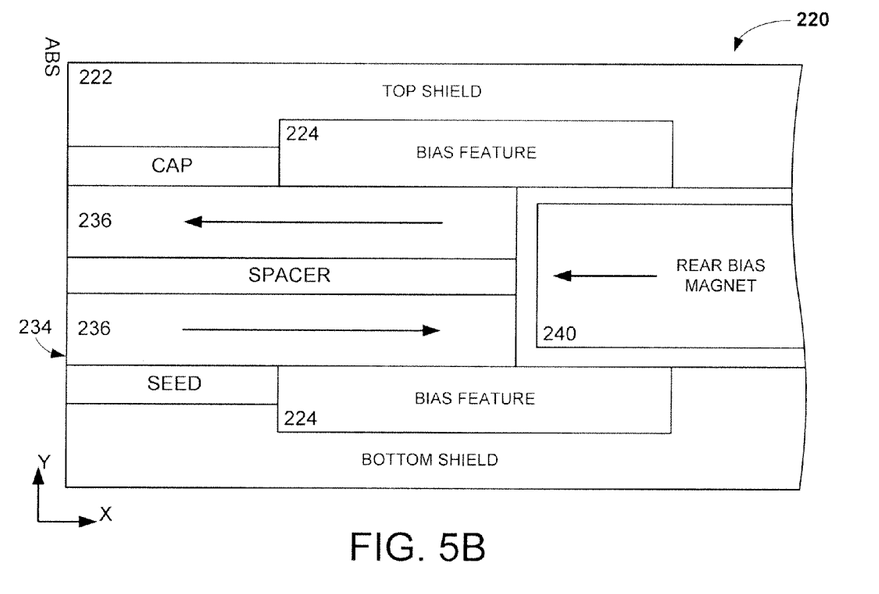

FIGS. 5A and 5B respectively display ABS and cross-section block representations of another example magnetic element 220 that utilizes the top shield 222 to pass bias magnetization to the side shield laminations 226. First and second coupling layers 228 and 230 can provide coupled transmission, such as through RKKY interaction, of the magnetization from the top shield 222 to the magnetically free layers 232 of the side shield laminations 226. The first and second coupling layers 228 and 230 can be constructed as similar or dissimilar materials that are tuned to provide predetermined magnetization magnitudes and out of phase directions with respect to the default magnetizations of the magnetic stack 234 free layers 236 for the respective side shield free layers 232.

The use of the coupling layers 228 and 230 can allow for fewer bias features 224 to set the default magnetization of the magnetic stack 234 and the side shield laminations 226 through the utilization of the top shield 222 to transmit magnetic flux. The bias features 224 are shown directly attached to the free layers 236 of the magnetic stack 234 as shown in FIG. 5B from cross-section line 238, but such configuration is not limiting as the rear bias magnet 240 can set the default magnetization of the free layers 236 while the bias features 224 are attached to one, or both, side shield laminations 226.

Figure 6A:
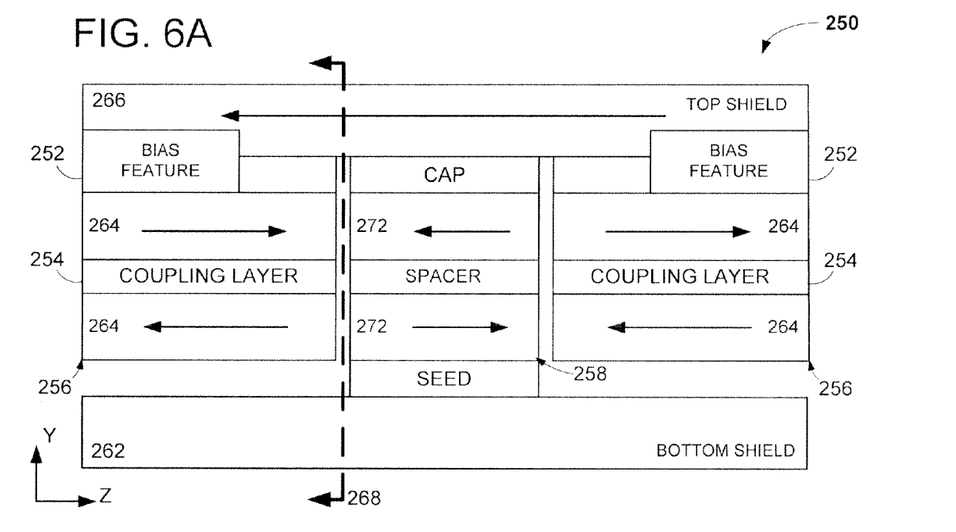
FIGS. 6A and 6B respectively show front and cross-section block representations of an example magnetic element.
Figure 6B:
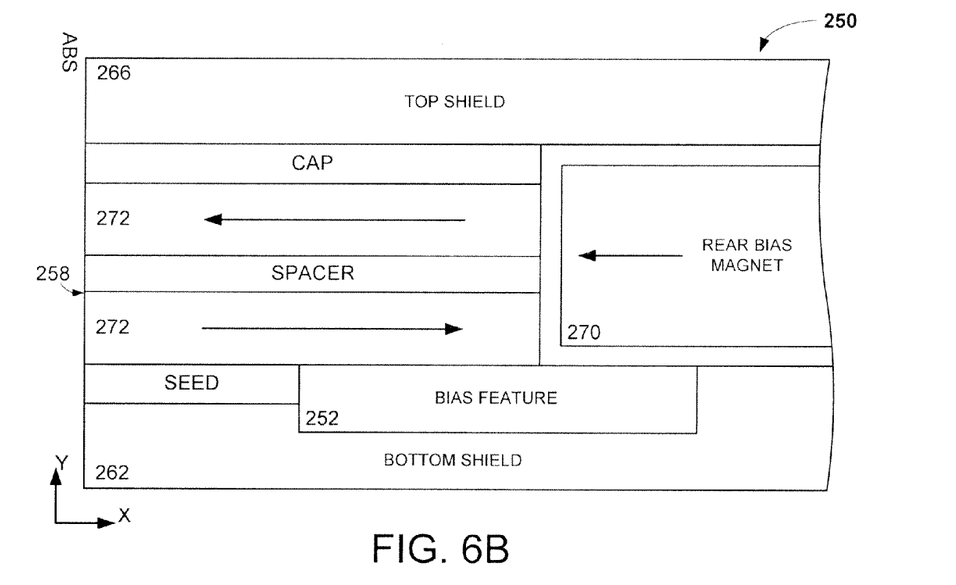

FIGS. 6A and 6B further illustrate example magnetic element 250 embodiments that combine the use of bias features 252 and coupling layers 254 to dictate bias magnetizations in side shield laminations 256 and default magnetizations in the magnetic stack 258. As shown, bias features are positioned on the ABS in contact with each side shield lamination 256 and with one of the magnetic stack 258 free layers 260 proximal the bottom shield 262. The configuration of a single bias feature 252 on each side shield lamination 256 and the magnetic stack 258 can simplify construction of the magnetic element 250 while decreasing susceptibility to process and design variability.

The configuration of the coupling layer 254 between the free layers 264 of the side shield laminations 256 along with the ability of the top shield 266 to transmit magnetic flux laterally can allow a single bias feature 252 to be sufficient to set the bias magnetizations. FIG. 6B shows the magnetic element 250 along line 268 and illustrates how the bias feature 252 attached to the magnetic stack 258 is positioned distal the ABS and can be supplemented by a rear bias magnet 270 to set the magnetically free layers 272 of the magnetic stack 258 to a default magnetization.

The magnetic element 250 can provide tuned operation through material and configuration selection of the bias features 252 and coupling layers 254 that can accommodate a variety of performance criteria, such as increased data track capacity and decreased magnetic width, catered to reduced form factor, heightened data bit capacity, data storage devices. However, the combination of coupling layer 254 and bias features 252 is not limited to the configuration shown in FIGS. 6A and 6B as the bias features 252 can be more or less plentiful and positioned to flow bias magnetization through the bottom shield 262.

Figure 7:
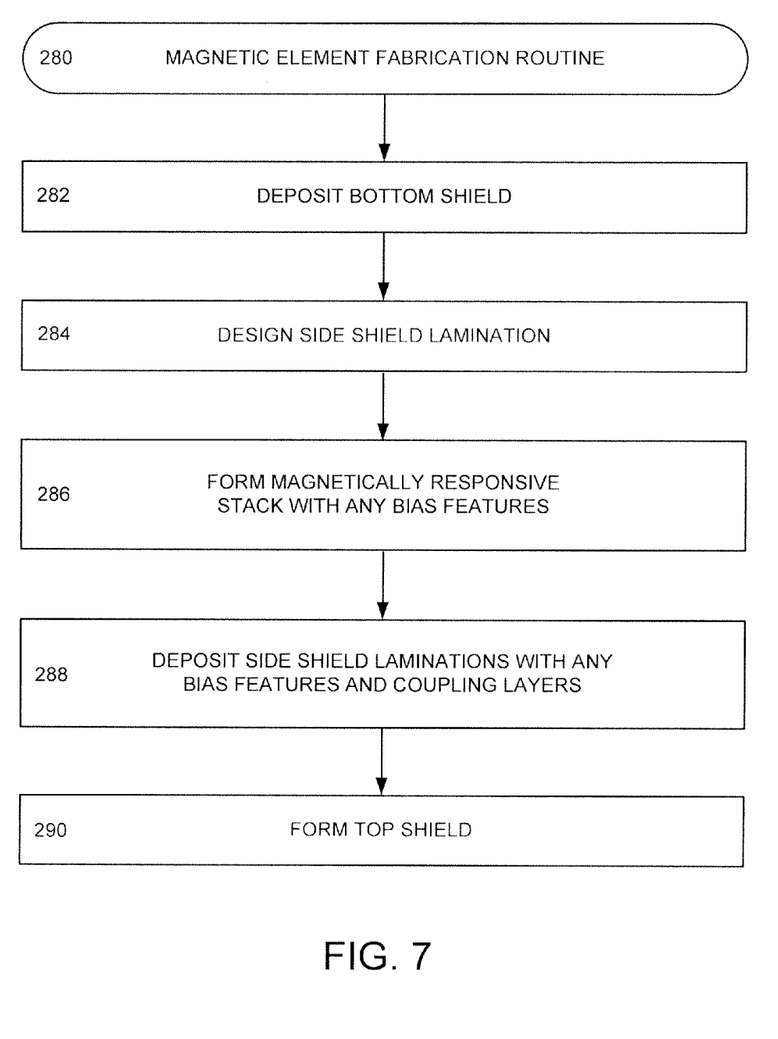
FIG. 7 provides a flowchart illustrating steps of an exemplary magnetic element fabrication routine conducted in accordance with various embodiments.

FIG. 7 provides an exemplary magnetic element fabrication routine 280 conducted in accordance with various embodiments to provide side shield laminations with bias magnetizations that oppose magnetic stack magnetizations. The routine 280 initially deposits a bottom shield on a substrate in step 282. The bottom shield can be constructed of any material capable of absorbing magnetic flux away from a magnetic stack, such as soft magnetic materials like NiFe.

Step 284 then designs a side shield lamination to provide bias magnetizations that oppose the default magnetization of a magnetic stack. As generally illustrated in FIGS. 3A-6B, a side shield lamination can have one or more bias features and coupling layers that set the bias magnetization, and perhaps the default magnetization of the magnetic stack as well. While some bias features and coupling layers may be formed prior to step 286 depending on the design from step 284, a magnetically responsive stack is formed atop the bottom shield in step 286.

The magnetic stack may be any number of configurations adapted to read or write data. One such stack embodiment is the trilayer configuration shown in FIG. 2 that is characterized by no pinned magnetizations and dual magnetically free layers separated by a non-magnetic spacer layer. Regardless of the configuration of the magnetic stack, step 288 proceeds to deposit the side shield laminations designed in step 284 with any bias features and coupling layers adapted to allow the tuned bias magnetization magnitude and direction of the magnetically free layers of the side shield laminations.

With the bias features and coupling layers constructed to provide a bias magnetization that opposes a default magnetization of the magnetic stack, step 290 caps the side shield laminations and magnetic stack with a top shield. The top shield can be formed of any material with any size that may or may not be configured to transmit magnetic flux from the bias features to the respective side shield laminations.

Through the routine 280, a high cross-track resolution magnetic element capable of increased data bit density applications can be constructed by setting bias magnetizations in the side shield laminations with bias features, coupling layers, or both. However, the routine 280 is not limited as the various steps can be omitted, changed, and added. For example, the side shield laminations and magnetic stack can be formed concurrently as a single magnetic lamination that is later separated with isolation trenches to physically isolate the respective components.

It can be appreciated that the tuning of the side shields of a magnetic element with a bias magnetization can control stray magnetic fields while resisting coupling effects that can be problematic to reduced form factor data storage devices. The ability to provide the bias magnetization in a variety of bias feature and coupling layer configuration provides increased cross-track resolution and data track capacity while increasing resistance to process and design variability. As such, the present technology allows for the fabrication of a magnetic element capable of operating in larger capacity data storage devices with higher data access accuracy and faster data transfer times.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims arc expressed. For example, the particular elements may vary depending on the particular application without departing from the spirit and scope of the present technology.

What is claimed is:

1. An apparatus comprising a magnetic stack having a first magnetically free layer with a predetermined magnetization, and a side shield lamination separated from the magnetic stack on an air bearing surface (ABS), configured with a first width on the ABS, and biased to a bias magnetization that opposes the predetermined magnetization by a shield bias feature contacting the side shield lamination with a second width on the ABS without contacting the magnetic stack, the first and second widths measured parallel to the predetermined magnetization and the first width being greater than the second width.

2. The apparatus of claim 1, wherein the magnetic stack is configured as a trilayer read sensor comprising the first magnetically free layer and a second magnetically free layer without a magnetically pinned reference structure.

3. The apparatus of claim 2, wherein a first sub-layer of the side shield lamination is laterally aligned with the first magnetically free layer on the ABS and a second sub-layer of the side shield lamination is laterally aligned with the second magnetically free layer on the ABS.

4. The apparatus of claim 3, wherein the first sub-layer has a first bias magnetization that opposes the predetermined magnetization.

5. The apparatus of claim 4, wherein the second sub-layer has a second bias magnetization that matches the predetermined magnetization and opposes the first bias magnetization.

6. A magnetic element comprising a magnetic stack having a first magnetically free layer with a predetermined magnetization, the magnetic stack disposed between and separated from first and second side shield laminations on an air bearing surface (ABS), each side shield lamination having a first width on the ABS and biased to a bias magnetization that opposes the predetermined magnetization, the bias magnetization corresponding to first and second shield bias features respectively having a second width on the ABS and contacting the first and second side shield laminations without contacting the magnetic stack, the first and second widths measured parallel to the predetermined magnetization and the first width being greater than the second width.

7. The magnetic element of claim 6, wherein the magnetic stack has the first magnetically free layer and a second magnetically free layer respectively laterally aligned with first and second bias sub-layers of each side shield lamination, the first and second magnetically free layers set to first and second sub-layer predetermined magnetizations oriented in substantially opposite directions.

8. The magnetic element of claim 7, wherein a the first shield bias feature contacts the first side shield lamination on the ABS to impart opposing first and second bias magnetizations respectively in the first and second bias sub-layers.

9. The magnetic element of claim 8, wherein the first shield bias feature is a lamination of antiferromagnetic layers having different blocking temperatures.

10. The magnetic element of claim 6, wherein a first stack biasing feature contacts the first magnetically free layer of the magnetic stack and is separated from the ABS to impart the predetermined magnetization onto the magnetic stack.

11. The magnetic element of claim 10, wherein a rear bias magnet positioned distal to the ABS imparts the predetermined magnetization onto the magnetic stack.

12. The magnetic element of claim 10, wherein a second stack biasing feature contacts a second magnetically free layer of the magnetic stack, opposite the first stack biasing feature.

13. The magnetic read element of claim 10, wherein the first stack biasing feature is positioned in a reduced thickness portion of a top shield.

14. A transducing head comprising:
a trilayer magnetic stack having first and second magnetically free layers configured with independent predetermined magnetizations; and
a side shield lamination separated from the magnetic stack with a first width on an air bearing surface (ABS) and configured with first and second magnetic sub-layers each biased to bias magnetizations that respectively oppose the independent predetermined magnetizations by a shield bias feature having a second width on the ABS, the shield bias feature separated from the trilayer magnetic stack by a seed layer and contacting the side shield lamination without contacting the trilayer magnetic stack, the first and second widths measured parallel to each independent predetermined magnetization and the first width being greater than the second width.

15. The transducing head of claim 14, wherein a first coupling layer separates the first and second magnetic sub-layers and a second coupling layer connects the side shield lamination with a top shield.

16. The transducing head of claim 15, wherein the first and second coupling layers are configured to provide RKKY coupling.

17. The transducing head of claim 15, wherein the top shield transmits bias magnetization from a first stack biasing feature attached to the first magnetically free layer to the first and second magnetic sub-layers.

18. The transducing head of claim 14, wherein a first coupling layer separates the first and second magnetic sub-layers and the shield bias feature is disposed between the side shield lamination and a top shield.

19. The transducing head of claim 17, wherein a second stack biasing feature contacts the second magnetically free layer in a reduced thickness portion of a bottom shield, opposite the top shield.

20. The transducing head of claim 17, wherein the first coupling layer provides negative RKKY coupling.

* * * * *